United States Patent
Muralidharan et al.

(10) Patent No.: US 11,086,806 B2
(45) Date of Patent: Aug. 10, 2021

(54) MEMORY ACCESS SYSTEM TO ACCESS ABSTRACTED MEMORY

(71) Applicant: Smart IOPS, Inc., Milpitas, CA (US)

(72) Inventors: Kirankumar Muralidharan, Karnataka (IN); Sathishkumar Udayanarayanan, Karnataka (IN)

(73) Assignee: Smart IOPS, Inc., Milpitas, CA (US)

( * ) Notice: Subject to any disclaimer, the term of this patent is extended or adjusted under 35 U.S.C. 154(b) by 130 days.

(21) Appl. No.: 16/429,239

(22) Filed: Jun. 3, 2019

(65) Prior Publication Data

US 2020/0379929 A1 Dec. 3, 2020

(51) Int. Cl.
*G06F 13/16* (2006.01)
*G06F 12/06* (2006.01)

(52) U.S. Cl.
CPC ...... *G06F 13/1678* (2013.01); *G06F 12/0646* (2013.01)

(58) Field of Classification Search
None
See application file for complete search history.

(56) References Cited

U.S. PATENT DOCUMENTS

| | | | | |
|---|---|---|---|---|
| 6,377,500 | B1* | 4/2002 | Fujimoto | G06F 12/0246 365/230.01 |
| 8,006,000 | B2* | 8/2011 | Saito | G06F 12/1475 710/23 |
| 9,378,131 | B2* | 6/2016 | Kurotsuchi | G06F 12/0246 |
| 10,222,984 | B1* | 3/2019 | O'Brien, III | G06F 3/0688 |
| 2007/0261059 | A1* | 11/2007 | Orth | G06F 12/0284 719/312 |
| 2015/0278112 | A1* | 10/2015 | Gschwind | G06F 9/3824 711/205 |
| 2016/0350225 | A1* | 12/2016 | Podaima | G06F 12/109 |
| 2018/0262567 | A1* | 9/2018 | Klein | G06F 3/0631 |
| 2019/0004944 | A1* | 1/2019 | Widder | G06F 12/0292 |
| 2020/0192818 | A1* | 6/2020 | Gandhi | G06F 12/1045 |

* cited by examiner

*Primary Examiner* — Yaima Rigol
(74) *Attorney, Agent, or Firm* — Chip Law Group

(57) ABSTRACT

A memory access system includes a memory that is abstracted into data structures. The memory access system further includes a processor that generates an access request for accessing the abstracted memory by way of a structure access circuit of the memory access system. As the memory is abstracted into the data structures and the processor accesses the abstracted memory using the data structures, an addressing capability of the processor is extended. Further, the computing overhead of the processor is reduced, as the processor performs various memory operations by accessing the memory by way of the structure access circuit.

15 Claims, 6 Drawing Sheets

MEMORY ACCESS SYSTEM TO ACCESS ABSTRACTED MEMORY

FIELD OF THE INVENTION

The present invention relates generally to electronic systems, and, more particularly, to a system for accessing a memory of an electronic device.

BACKGROUND

Memory access systems are typically implemented in electronic devices for performing various memory related operations such as writing of data to a memory of an electronic device, reading of the data from the memory, and the like. To access a memory location of the memory, a processor of the electronic device transmits a physical address of the memory location to the memory by way of an address bus. The processor accesses a number of memory locations in the memory based on its addressing capability which is defined by a width of the address bus. Thus, a processor with an n-bit address bus has an addressing capability of $2^n$ bytes, i.e., the processor can access $2^n$ memory locations. In an example, for a 1 megabyte (MB) memory, a processor with a 16-bit address bus can access $2^{16}$ memory locations, i.e., 64 kilobyte (kB) of the memory. As the number of memory locations that can be accessed by the processor is determined by its addressing capability, the processor is unable to access memory locations that are beyond its addressing capability.

A conventional approach to extend the addressing capability of the processor includes dividing the memory into multiple segments (such as code and data segments). For accessing the memory location in a segment (e.g., the data segment), the processor determines a physical address of the memory location based on a base address of the segment and an offset of the memory location within the segment. The base address refers to a starting position of the segment in the memory whereas the offset refers to a displacement of the memory location from the base address. In an example, the processor determines a 20-bit physical address for a 16-bit base address and a 16-bit offset, by performing a logical left shift operation to convert the 16-bit base address into a 20-bit base address. Further, the 16-bit offset is added to the 20-bit base address, thereby extending the addressing capability of the processor to $2^{20}$ memory locations, i.e., 1 MB.

Determining the physical address using the aforementioned approach, however, includes a significant number of computations, which leads to a computing overhead on the processor, and subsequently, increases power consumed by the processor. Additionally, the determination of the physical address by the processor increases a number of processing cycles required by the processor, thereby affecting performance of the processor.

Thus, it would be advantageous to have a memory access system that extends the addressing capability of the processor, reduces the computing overhead on the processor, and overcomes the above-mentioned problems of conventional memory access systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
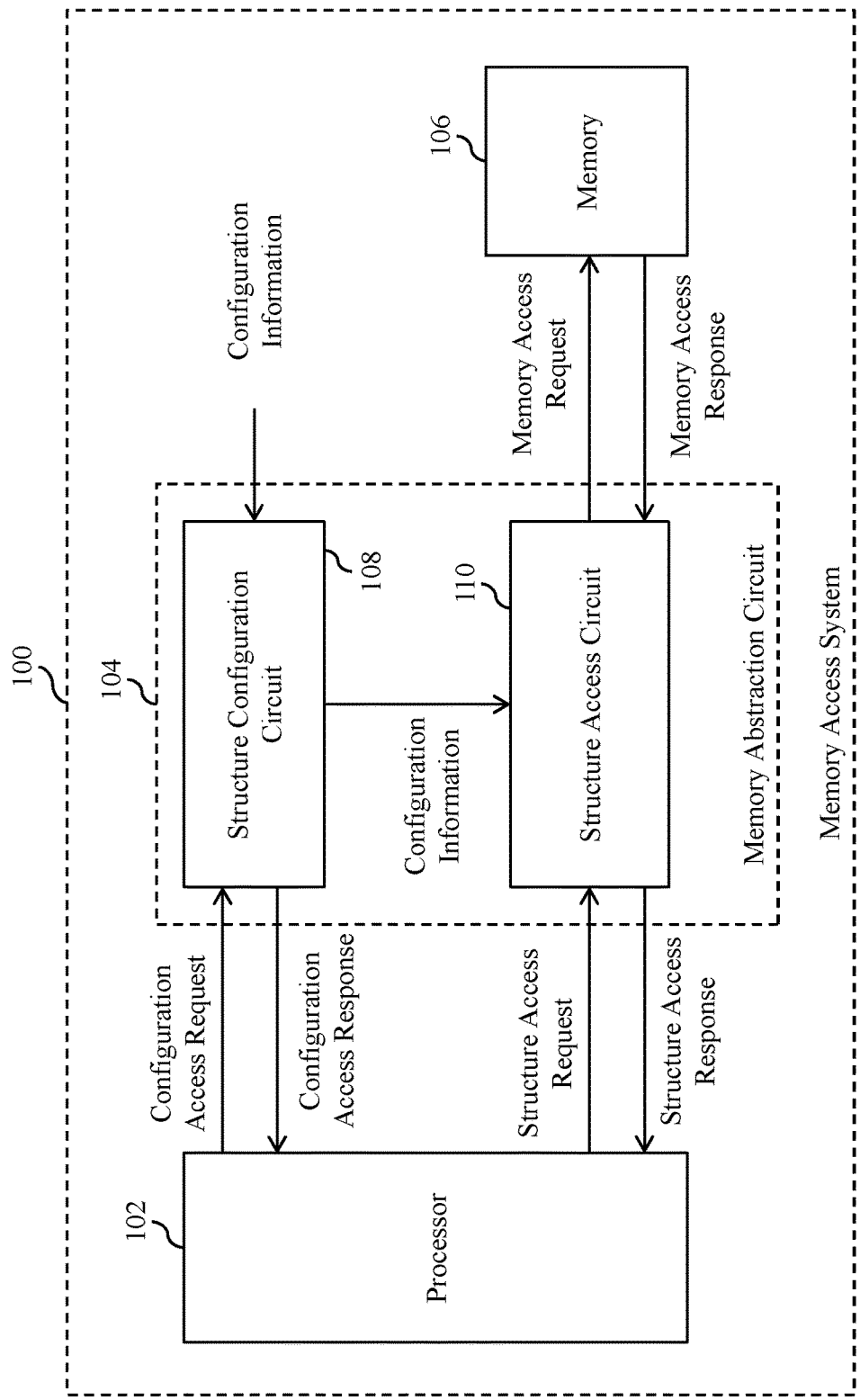
FIG. 1 illustrates a block diagram of a memory access system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment, the present invention provides a memory access system. The memory access system includes a memory and a structure access circuit that accesses the memory. The memory is abstracted into data structures such that each data structure includes a set of structure elements, and each structure element includes a set of structure sub-elements. The structure access circuit accesses the memory, and is configured to receive a structure access request from a processor for accessing a first structure element of the set of structure elements or a first structure sub-element of the set of structure sub-elements. The structure access circuit is further configured to generate a memory access request based on configuration information associated with the data structures and the structure access request. The memory access request includes a physical address of the first structure element or the first structure sub-element. Further, the structure access circuit is configured to perform, by accessing the physical address in the memory, a memory operation associated with the structure access request.

In another embodiment, the present invention provides a method for accessing a memory that is abstracted into data structures. Each data structure includes a set of structure elements, and each structure element includes a set of structure sub-elements. The method includes receiving a structure access request for accessing a first structure element of the set of structure elements or the first structure sub-element of the set of structure sub-elements of the memory. The method further includes generating a memory access request based on configuration information associated with the data structures and the structure access request. The memory access request includes a physical address of the first structure element or the first structure sub-element. The method further includes performing a memory operation associated with the structure access request. The memory operation is performed by accessing the physical address in the memory.

In yet another embodiment, the present invention provides a memory access system including a memory, a processor, a structure configuration circuit, and a structure access circuit. The memory is abstracted into data structures such that each data structure includes a set of structure elements, and each structure element includes a set of structure sub-elements. The structure configuration circuit stores configuration information associated with the data structures. The processor is connected to the structure configuration circuit for receiving the configuration information. Based on the configuration information, the processor generates a structure access request for accessing a first structure element of the set of structure elements or a first structure sub-element of the set of structure sub-elements. The structure access circuit is connected to the structure configuration circuit and the processor for receiving the configuration information and the structure access request, respectively. Based on the configuration information and the structure access request, the structure access circuit generates a memory access request such that the memory access request includes a physical address of the first structure element or the first structure sub-element. The structure access circuit performs, by accessing the physical address in the memory, one or more memory operations based on the structure access request.

Various embodiments of the present invention provide a method and a system for accessing a memory by a processor. The memory is accessed by way of a structure access circuit. The memory is abstracted into data structures such that each data structure includes a set of structure elements, and each structure element includes a set of structure sub-elements. A structure access request for accessing a structure element or a structure sub-element is generated by the processor. The structure access circuit receives the structure access request from the processor and generates, based on the configuration information and the structure access request, a memory access request. The memory access request includes a physical address of the structure element or the structure sub-element. The structure access circuit performs a memory operation associated with the structure access request by accessing the physical address in the memory.

The abstraction of the memory into data structures is dynamic. Thus, the configuration information is modified based on the dynamic abstraction of the memory and updated in the structure configuration circuit. The processor accesses the memory by way of structure elements or structure sub-elements instead of using the physical address of the memory location. Thus, the addressing capability of the processor is extended to access the available space of the memory. As the need for performing computations by the processor to determine the physical address is eliminated, a computing overhead on the processor is reduced, which subsequently reduces power consumed by the processor. Thus, the number of processing cycles required by the processor for accessing the memory reduces, thereby improving performance of the processor to execute various operations.

FIG. 1 illustrates a block diagram of a memory access system 100 in accordance with an embodiment of the present invention. The memory access system 100 may be implemented in data processing systems, data storage systems, or the like. The memory access system 100 includes a processor 102, a memory abstraction circuit 104, and a memory 106. The memory 106 is abstracted into data structures (shown later in FIG. 2A) by the memory abstraction circuit 104. Each data structure includes a set of structure elements (shown later in FIG. 2A) and each structure element includes a set of structure sub-elements (shown later in FIG. 2B). A structure element may be defined by at least one of an abstract data type such as a structure, data types such as an integer, double, or the like, an array of an abstract data type, or an array of an integer data type. A structure sub-element may be defined by data types such as integer, double, or the like, or an array of an integer or a double data type, or the like.

The processor 102 generates a configuration access request for accessing configuration information associated with the data structures. The configuration information includes a data structure identifier (ID) (hereinafter referred to as a "first data structure ID") and a base address (hereinafter referred to as a "first base address") that are associated with each data structure. The first base address is indicative of a starting position of a corresponding data structure in the memory 106. The configuration information further includes an element ID (hereinafter referred to as a "first element ID"), an element bit width (hereinafter referred to as a "first element bit width"), and an element offset (hereinafter referred to as a "first element offset") that are associated with each structure element. The first element bit width is indicative of a bit width of a corresponding structure element. The first element offset is indicative of a displacement of a corresponding structure element from the first base address. In an embodiment, each structure element is an array of an abstract data type, and is identified by an index corresponding to a position of the structure element in the array. The configuration information further includes a sub-element ID (hereinafter referred to as a "first sub-element ID"), a sub-element bit width (hereinafter referred to as a "first sub-element bit width"), and a sub-element offset (hereinafter referred to as a "first sub-element offset") that are associated with each structure sub-element. The first sub-element bit width is indicative of a bit width of a corresponding structure sub-element. The first sub-element offset is indicative of a starting position of each structure sub-element within the corresponding structure element.

The processor 102 transmits the configuration access request to the memory abstraction circuit 104. In response to the configuration access request, the processor 102 receives, from the memory abstraction circuit 104, a configuration access response that includes the configuration information. Based on the configuration information, the processor 102 generates a structure access request for accessing a structure element (such as a first structure element or a second structure element shown later in FIG. 2A) from the set of structure elements, or a structure sub-element (such as a first structure sub-element of the second structure element shown later in FIG. 2B) from the set of structure sub-elements. The structure access request may be generated based on a high-level language. The processor 102 transmits the structure access request to the memory abstraction circuit 104. In response to the structure access request, the processor 102 receives a structure access response from the memory abstraction circuit 104. Examples of the processor 102 include, but are not limited to, a reduced instruction set computing (RISC) processor, a complex instruction set computing (CISC) processor, and the like. It will be apparent to a person skilled in the art that although the processor 102 is shown to be internal to the memory access system 100, the scope of the present invention is not limited to it. In an alternate embodiment, the processor 102 may be external to the memory access system 100, without deviating from the scope of the present invention.

The memory abstraction circuit 104 is connected to the processor 102 for receiving the configuration access request and the structure access request. As the processor 102 accesses the memory 106 by way of the memory abstraction circuit 104, the memory abstraction circuit 104 acts as an abstraction layer between the processor 102 and the memory

106. The memory abstraction circuit 104 includes a structure configuration circuit 108 and a structure access circuit 110.

The structure configuration circuit 108 receives and stores the configuration information. In an embodiment, the structure configuration circuit 108 receives the configuration information from a first processor (not shown) which is different from the processor 102. The first processor generates the configuration information by performing an abstraction of the memory 106. The first processor may be internal or external to the memory access system 100. The configuration information may be generated based on a high-level language.

The structure configuration circuit 108 is connected to the processor 102 for receiving the configuration access request. In response to the configuration access request, the structure configuration circuit 108 transmits the configuration access response to the processor 102. The structure configuration circuit 108 provides the configuration information to the structure access circuit 110.

The structure access circuit 110 is connected to the structure configuration circuit 108 to receive the configuration information. The structure access circuit 110 is further connected to the processor 102 to receive the structure access request. The structure access circuit 110 may further receive multiple structure access requests from various processors (not shown).

The structure access circuit 110 generates a memory access request based on the configuration information and the structure access request. In other words, the structure access circuit 110 translates the structure access request into a memory access request based on the configuration information. When the processor 102 generates a structure access request for accessing the first structure element, the structure access request includes a data structure ID (such as a second data structure ID), an element ID (such as a second element ID), and an index (such as a first index) that are associated with the first structure element. Based on the first and second data structure IDs, the structure access circuit 110 identifies a second base address that is associated with the first structure element from the configuration information. Based on the first and second structure element IDs, the structure access circuit 110 further identifies from the configuration information, a second element offset and a second element bit width that are associated with the first structure element. The physical address of the first structure element is thus determined based on at least the second base address, the second element offset, the second element bit width, and the first index.

When the processor 102 generates the structure access request for accessing the first structure sub-element of the second structure element, the structure access request includes at least a data structure ID (such as a third data structure ID), an element ID (such as a third element ID), an index (such as a second index), and a sub-element ID (such as a second sub-element ID) that are associated with the first structure sub-element. Based on the first and third data structure IDs, the structure access circuit 110 identifies from the configuration information, a third base address that is associated with the first structure sub-element. Based on the first and third element IDs, the structure access circuit 110 further identifies from the configuration information, a third element offset and a third element bit width that are associated with the first structure sub-element. The structure access circuit 110 further identifies from the configuration information, a second sub-element offset and a second sub-element bit width that are associated with the first structure sub-element. The second sub-element offset and the second sub-element bit width are identified based on the first and second sub-element IDs. In an embodiment, the structure access circuit 110 determines the physical address of the first structure sub-element based on the third base address, the third element offset, the third element bit width, the second index, the second sub-element offset, and the second sub-element bit width. Further, the structure access circuit 110 accesses the physical address of the first structure sub-element. In another embodiment, for accessing the first structure sub-element of the second structure element, the structure access circuit 110 determines a physical address of the second structure element based on the third base address, the third element offset, the third element bit width, and the second index, and accesses the physical address of the second structure element. Further, the structure access circuit 110 extracts the first structure sub-element from the second structure element based on the second sub-element offset, and the second sub-element bit width.

The memory access request includes at least the physical address of the first structure element, the second structure element, or the first structure sub-element to be accessed. Based on the memory access request, the structure access circuit 110 performs a memory operation associated with the structure access request by accessing the physical address in the memory 106. In an embodiment, when the memory operation is a write operation, the structure access request further includes data (such as first data) for writing to the memory 106. Thus, the memory access request further includes the first data. The structure access circuit 110 accesses the physical address to write the first data to the memory 106. In another embodiment, when the memory operation is a read operation, the structure access circuit 110 accesses the physical address to read data (such as second data) stored in the memory 106. In an example, the second data is 8-bit data. In a scenario, where the data corresponding to the first structure element or the first structure sub-element is less than 8-bits, the structure access circuit 110 may further extract, from the second data, third data that corresponds to the first structure element or the first structure sub-element.

The structure access circuit 110 receives a memory access response from the memory 106 after completion of the memory operation. The memory access response includes at least an acknowledgement that indicates completion of the memory operation. When the memory operation is a read operation, the memory access response further includes one of the second data or the third data, and a data status that is indicative of a status of one of the second or third data. The data status of the second or third data may be one of valid data or invalid data.

Based on the memory access response, the structure access circuit 110 generates the structure access response. The structure access circuit 110 further transmits the structure access response to the processor 102. When the memory operation is a write operation, the structure access response may include the acknowledgement. When the memory operation is a read operation, the structure access response may include one of the second or third data, the data status of one of the second or third data, and the acknowledgement. The structure access circuit 110 transmits the structure access response to the processor 102 in response to the structure access request.

The memory 106 corresponds to a main memory of the memory access system 100. Examples of the memory 106 include, but are not limited to, one or more volatile memories such as a dynamic random-access memory (DRAM) or a static RAM (SRAM). The abstraction of the memory 106 is based on an abstract data type of a high-level language (i.e., a high-level programming language). In an example, the abstract data type is a structure. The abstraction of the memory 106 into the data structures is dynamic, i.e., the first processor may change the abstraction of the memory 106. Further, the first processor may modify the configuration information based on the dynamic abstraction of the memory 106 and may transmit the modified configuration information to the structure configuration circuit 108. Elements of the memory 106 have been explained in detail in conjunction with FIGS. 2A and 2B.

It will be apparent to a person skilled in the art that performing the abstraction of the memory 106 may not be limited to the first processor. In an alternate embodiment, the processor 102 performs the abstraction of the memory 106 and generates the configuration information. Further, the processor 102 transmits the configuration information to the structure configuration circuit 108 and generates the structure access request based on the generated configuration information.

Figure 2A:
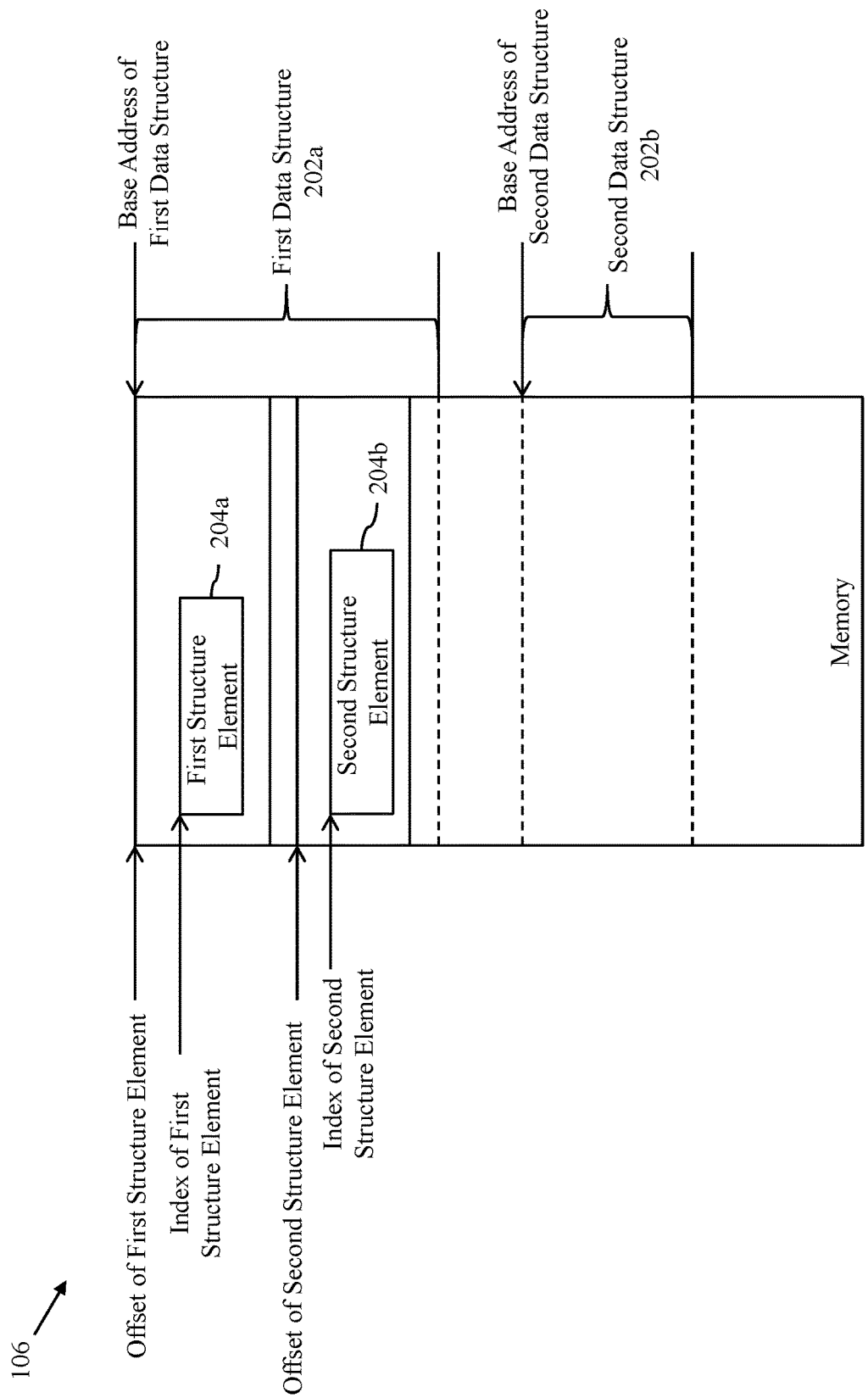
FIG. 2A illustrates a representation of an abstracted memory of the memory access system of FIG. 1 in accordance with an embodiment of the present invention.

FIG. 2A illustrates a representation of the abstracted memory 106 in accordance with an embodiment of the present invention. The memory 106 is abstracted into data structures of which first and second data structures 202a and 202b are shown. Data structure IDs of the first and second data structures 202a and 202b are 'K' and 'J', respectively. Base addresses (such as the first base address) of the first and second data structures 202a and 202b are indicative of a starting position of the first and second data structures 202a and 202b in the memory 106, respectively.

The first data structure 202a includes a set of structure elements of which the first structure element (hereinafter designated as, "the first structure element 204a") and a second structure element 204b are shown. The second and third element IDs of the first and second structure elements 204a and 204b are 'X' and 'Y', respectively. The first and second indexes of the first and second structure elements 204a and 204b are 'L' and 'P', respectively. Offsets (such as the first element offset) of the first and second structure elements 204a and 204b are indicative of displacements of the first and second structure elements 204a and 204b from the first base address of the corresponding data structure, respectively. The second data structure 202b may be structurally similar to the first data structure 202a.

Figure 2B:
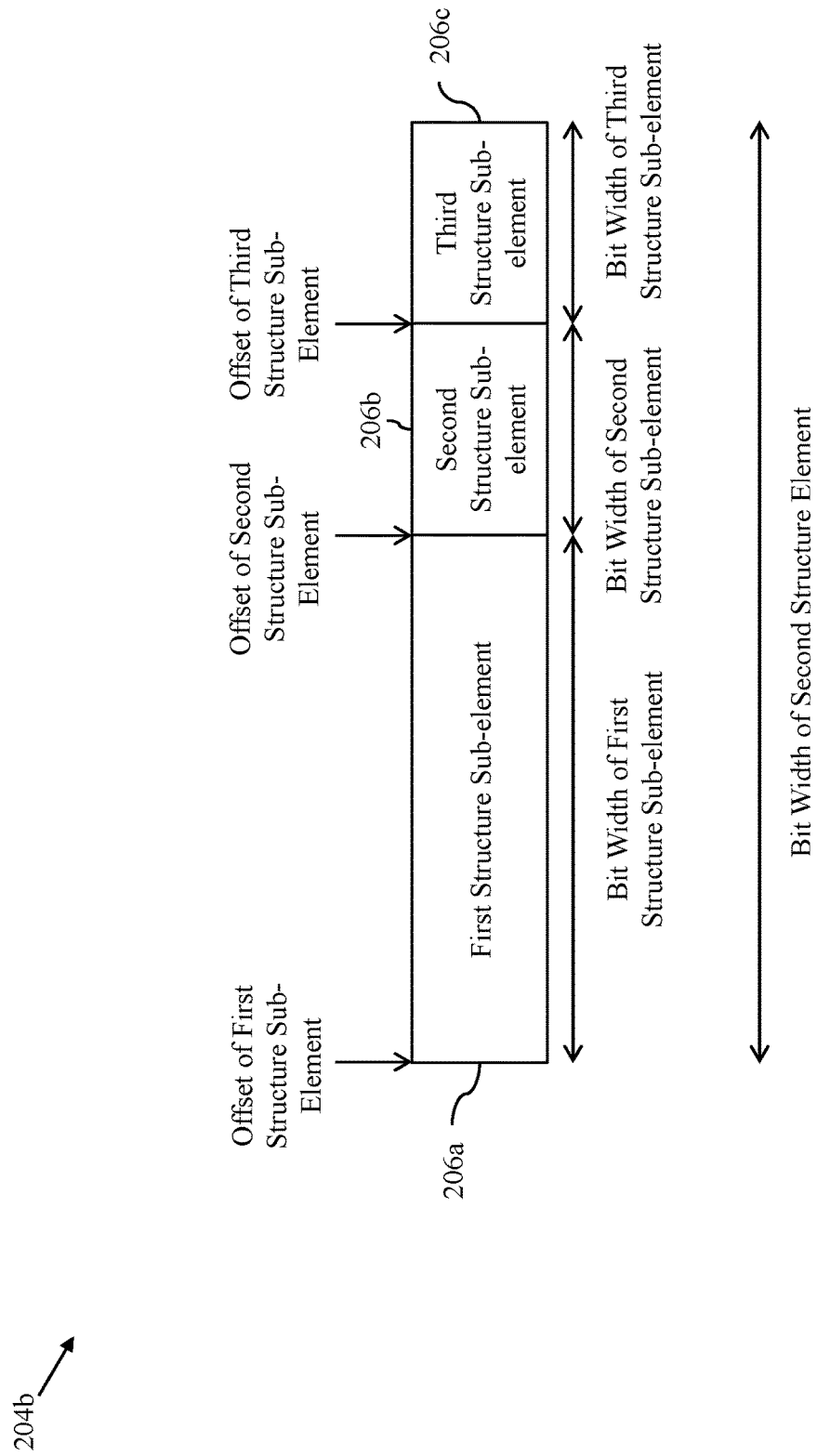
FIG. 2B illustrates a representation of a structure element of the abstracted memory of FIG. 2A in accordance with an embodiment of the present invention.

FIG. 2B illustrates a representation of the second structure element 204b in accordance with an embodiment of the present invention. The second structure element 204b includes the first structure sub-element (hereinafter designated as, "the first structure sub-element 206a"), a second structure sub-element 206b, and a third structure sub-element 206c. Offsets (such as the first sub-element offset) of the first through third structure sub-elements 206a-206c are indicative of displacements of the first through third structure sub-elements 206a-206c within the corresponding structure element, respectively. The second sub-element ID, a third sub-element ID, and a fourth sub-element ID of the first through third structure sub-elements 206a-206c are 'A', 'B', and 'C', respectively. In an example, the second sub-element bit width, a third sub-element bit width, and a fourth sub-element bit width of the first through third structure sub-elements 206a-206c are '24-bits', '4-bits', and '2-bits', respectively. Thus, the third element bit width of the second structure element 204b is 30-bits, i.e., addition of bit widths of the first through third structure sub-elements 206a-206c.

It will be understood by a person skilled in the art that even though the present invention illustrates the first through third structure sub-elements 206a-206c in FIG. 2B as mutually exclusive, the scope of the present invention is not limited to it. In an alternate embodiment of the present invention, the second structure element 204b further includes a fourth structure sub-element (not shown) that overlaps with at least one of the first through third structure sub-elements 206a-206c.

In operation, the processor 102 generates the structure access request for accessing one of the first structure element 204a or the first structure sub-element 206a. For accessing the first structure element 204a, the structure access request includes the second data structure ID, i.e., 'K', the second element ID, i.e., 'X', and the first index, i.e., 'L'. The structure access circuit 110 matches the second data structure ID with the first data structure ID of each data structure to identify the second base address, i.e., 'Base-Address [K]', from the configuration information. The structure access circuit 110 further matches the second element ID with the first element ID of each structure element to identify, from the configuration information, the second element bit width and the second element offset, i.e., 'Element-Offset [X]'. Based on the second element bit width and the first index, the structure access circuit 110 determines a first index offset, i.e., 'Index-Offset [L]' within the array. The structure access circuit 110 determines the physical address of the first structure element 204a (hereinafter referred to as a "first physical address") using equation (1) given below:

$$\text{First Physical Address} = \text{Base-Address}[K] + \text{Element-Offset}[X] + \text{Index-Offset}[L] \quad (1)$$

The memory access request for accessing the first structure element 204a includes the first physical address. Based on the memory access request, the structure access circuit 110 performs a memory operation associated with the structure access request by accessing the first physical address. In an embodiment, when the memory operation is a write operation, the structure access request further includes the first data for writing to the memory 106. Thus, the memory access request further includes the first data. The structure access circuit 110 accesses the first physical address to write the first data to the memory 106. In another embodiment, when the memory operation is a read operation, the structure access circuit 110 accesses the first physical address to read the second data stored in the memory 106. The structure access circuit 110 extracts, from the second data, the third data corresponding to the first structure element 204a. Further, the structure access circuit 110 transmits the structure access response to the processor 102. The structure access response includes the acknowledgement, the third data, and the data status.

For accessing the first structure sub-element 206a, the structure access request includes the third data structure ID, i.e., 'K', the third element ID, i.e., 'Y', the second index, i.e., 'P', and the second sub-element ID, i.e., 'A'. The structure access circuit 110 matches the third data structure ID with the first data structure ID of each data structure to identify, from the configuration information, the third base address, i.e., 'Base-Address [K]'. The structure access circuit 110 further matches the third element ID with the first element ID of each structure element to identify from the configuration information, the third element bit width and the third element offset, i.e., 'Element-Offset [Y]'. Based on the third element bit width and the second index, the structure access circuit 110 determines a second index offset, i.e., 'Index-Offset [P]' within the array.

The structure access circuit 110 further matches the second sub-element ID with the first sub-element ID of each structure sub-element to identify, from the configuration information, the second sub-element bit width and the second-sub element offset, i.e., 'Sub-Element-Offset [A]' within the second structure element 204b. The structure access circuit 110 determines the physical address of the first structure sub-element 206a (hereinafter referred to as a "second physical address") using equation (2) given below:

Second Physical Address=Base-Address[K]+Element-Offset[Y]+Index-Offset[P]+Sub-Element-Offset[A] (2)

The memory access request for accessing the first structure sub-element 206a thus includes the second physical address. The structure access circuit 110 performs a memory operation by accessing the second physical address in a manner similar to a memory operation performed by accessing the first physical address.

Although the present invention describes determination of the second physical address for accessing the first structure sub-element 206a, the scope of the present invention is not limited to it. In an alternate embodiment of the present invention, for accessing the first structure sub-element 206a, the structure access circuit 110 determines the physical address of the second structure element 204b (hereinafter referred to as a "third physical address"). The structure access circuit 110 determines the third physical address in a manner similar to the determination of the first physical address. Further, the structure access circuit 110 accesses the third physical address and extracts the first structure sub-element 206a from the second structure element 204b based on the second sub-element bit width and the second-sub element offset, i.e., 'Sub-Element-Offset [A]'.

It will be understood by a person having ordinary skill in the art that the determination of physical addresses using equations (1) and (2) may include multiple multiplication and division operations associated with the element and sub-element bit widths, apart from the addition operations.

It will be apparent to a person skilled in the art that the structure access circuit 110 may access more than one physical address to execute the read or write operations when a bit width of a structure element or a structure sub-element to be accessed is greater than a number of bits that are read from the memory 106 or written to the memory 106 at a time.

It will further be apparent to a person skilled in the art that the structure access circuit 110 may perform more than one memory operation to accomplish the read or write operation when a bit width of a structure element or a structure sub-element to be accessed is less than a number of bits that are read from the memory 106 or written to the memory 106 at a time. For example, when the third sub-element bit width of the second structure sub-element 206b is 4-bits and the number of bits that is to be read from the memory 106 or written to the memory 106 at a time is 8-bits, the structure access circuit 110 determines a physical address of the second structure sub-element 206b. The physical address of the second structure sub-element 206b (hereinafter referred to as a "fourth physical address") is determined in a manner similar to the determination of the physical address of the first structure sub-element 206a. Further, the structure access circuit 110 accesses the fourth physical address in the memory 106.

When the fourth physical address is accessed for performing a write operation associated with the structure access request, the structure access circuit 110 performs read, modify, and write operations to accomplish the write operation. For example, to write fourth data of 4-bits, the structure access circuit 110 performs the read operation, i.e., reads fifth data of 8-bits from the memory 106 that is stored at the fourth physical address. Further, the structure access circuit 110 performs the modify operation, i.e., modifies the fifth data to generate sixth data of 8-bits, and the write operation, i.e., writes the sixth data at the fourth physical address. The sixth data is generated such that the 4-bits corresponding to the second structure sub-element 206b are modified based on the fourth data and remaining 4-bits remain unmodified. For example, if the fourth data is '1010' and the fifth data is '00001101' of which the first four bits, i.e., 0000, correspond to the second structure sub-element 206b, the structure access circuit 110 reads the fifth data and modifies the fifth data to generate the sixth data which is '10101101'. Thus, only the first 4-bits corresponding to the second structure sub-element 206b are modified and the remaining 4-bits remain unmodified.

When the fourth physical address is accessed for performing a read operation associated with the structure access request, the structure access circuit 110 performs read and extract operations to accomplish the read operation. For example, to read seventh data of 4-bits, the structure access circuit 110 performs the read operation, i.e., reads eighth data of 8-bits from the memory 106 that is stored at the fourth physical address. Further, the structure access circuit 110 performs the extract operation, i.e., extracts the seventh data of 4-bits from the eighth data such that the seventh data corresponds to the second structure sub-element 206b. The structure access circuit 110 transmits the seventh data to the processor 102. For example, if the eighth data stored at the fourth physical address is '10101101' of which the first four bits correspond to the second structure sub-element 206b, the structure access circuit 110 reads the eighth data and extracts the seventh data which is '1010'. Thus, only the first 4-bits corresponding to the second structure sub-element 206b are transmitted to the processor 102 by the structure access circuit 110.

Figure 3A:
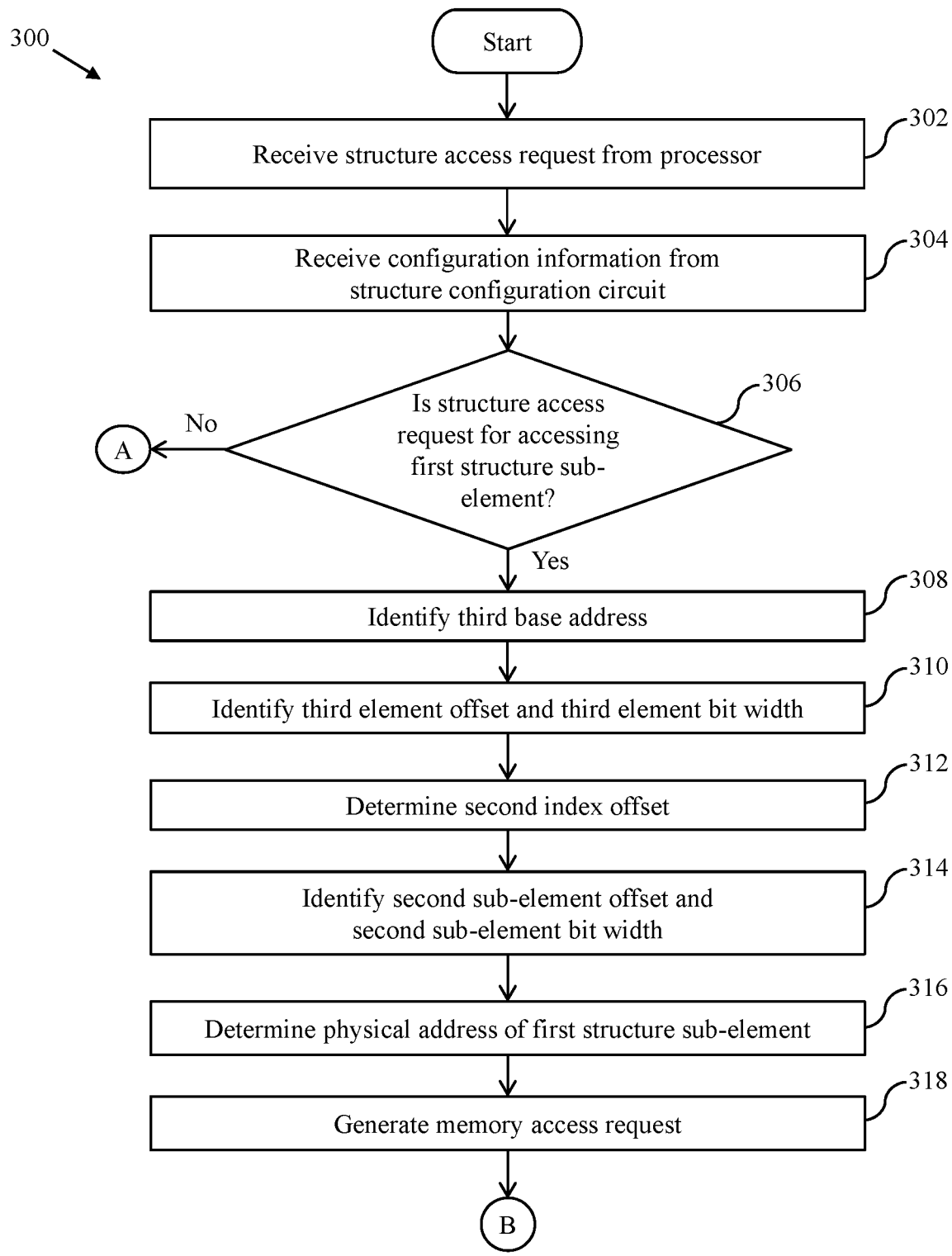
FIGS. 3A-3C, collectively, represent a flow chart that illustrates a method for accessing a memory in accordance with an embodiment of the present invention.
Figure 3B:
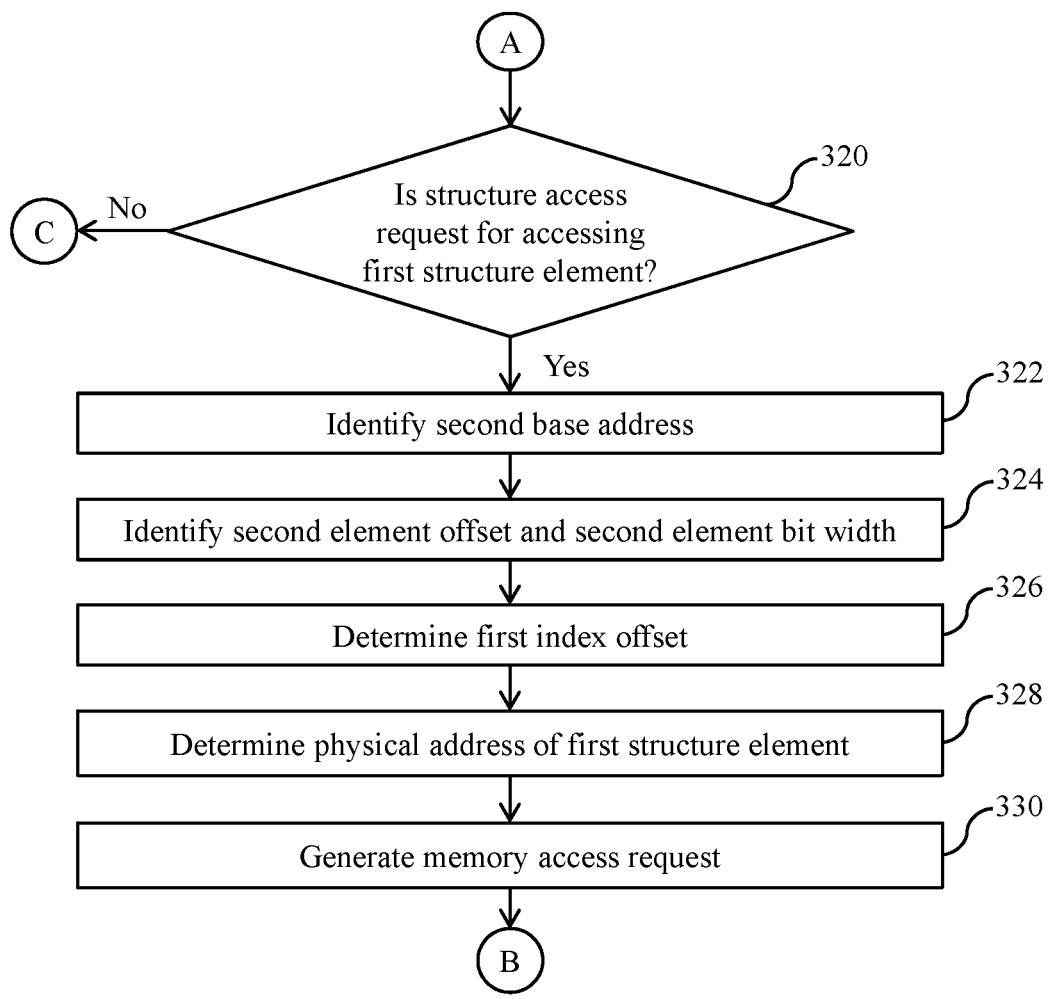
Figure 3C:
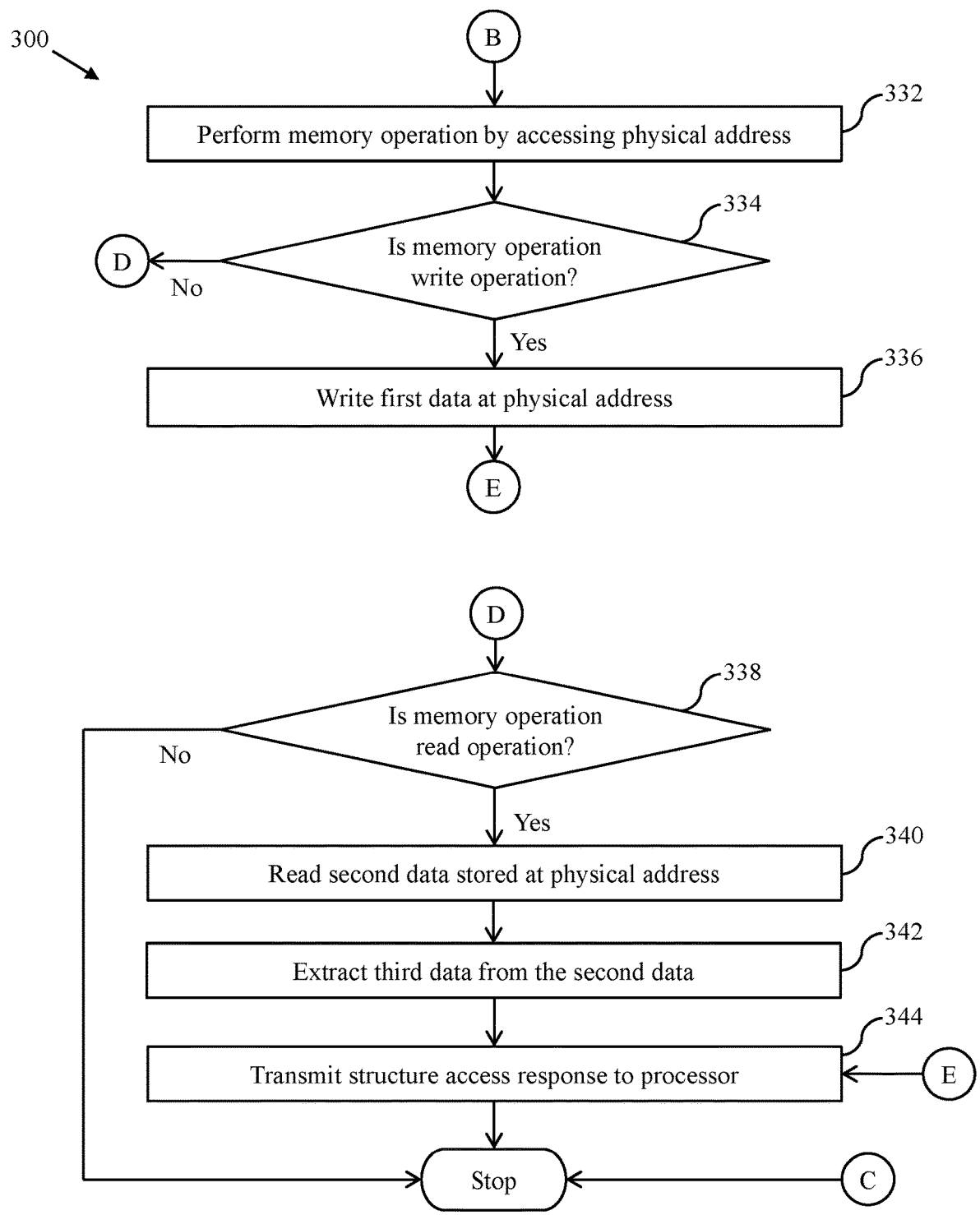

FIGS. 3A-3C, collectively, represent a flow chart 300 that illustrates a method for accessing the memory 106 in accordance with an embodiment of the present invention.

Referring now to FIG. 3A, at step 302, the structure access circuit 110 receives the structure access request from the processor 102 for accessing a structure element (such as the first structure element 204a) or a structure sub-element (such as first structure sub-element 206a). At step 304, the structure access circuit 110 receives the configuration information from the structure configuration circuit 108.

At step 306, the structure access circuit 110 determines whether the structure access request is for accessing the first structure sub-element 206a. If at step 306, the structure access circuit 110 determines that the structure access request is for accessing the first structure sub-element 206a, step 308 is performed.

At step 308, the structure access circuit 110 identifies the third base address, i.e., 'Base-Address [K]', associated with the first structure sub-element 206a. The third base address is identified based on the third data structure ID, i.e., 'K', and the first data structure ID of each data structure. At step 310, the structure access circuit 110 further identifies the third element bit width and the third element offset, i.e., 'Element-Offset [Y]', that are associated with the first structure sub-element 206a. The third element offset and the third element bit width are identified based on the first element ID and the third element ID, i.e., 'Y'. At step 312, the structure access circuit 110 determines the second index offset, i.e., 'Index-Offset [P]', based on the second index and the third element bit width.

At step 314, the structure access circuit 110 further identifies the second sub-element offset, i.e., 'Sub-Element-Offset [A]', and the second sub-element bit width that are associated with the first structure sub-element 206a. The second sub-element offset and the second sub-element bit width are identified based on the first sub-element ID and the second sub-element ID, i.e., 'A'. At step 316, the structure access circuit 110 determines the second physical address (i.e., the physical address of the first structure sub-element 206a) based on the third base address, the third element offset, the third element bit width, the second index, and the second sub-element bit width.

At step 318, the structure access circuit 110 generates a memory access request based on the configuration information and the structure access request. In other words, the structure access circuit 110 translates the structure access request into the memory access request based on the configuration information. The memory access request includes the second physical address. At step 306, if the structure access circuit 110 determines that the structure access request is not for accessing the first structure sub-element 206a, step 320 is performed.

Referring now to FIG. 3B, at step 320, the structure access circuit 110 determines whether the structure access request is for accessing the first structure element 204a. If at step 320, the structure access circuit 110 determines that the structure access request is for accessing the first structure element 204a, step 322 is performed.

At step 322, the structure access circuit 110 identifies the second base address, i.e., 'Base-Address [K]', associated with the first structure element 204a. The second base address is identified based on the second data structure ID, i.e., 'K', and the first data structure ID. At step 324, the structure access circuit 110 further identifies the second element offset, i.e., 'Element-Offset [X]', and the second element bit width that are associated with the first structure element 204a. The second element offset and the second element width are identified based on the first element ID and the second element ID, i.e., 'X'. At step 326, the structure access circuit 110 determines the first index offset, i.e., 'Index-Offset [L]', based on the first index and the second element bit width.

At step 328, the structure access circuit 110 determines the first physical address (i.e., the physical address of the first structure element 204a) based on at least the second base address, the second element offset, the second element bit width, and the first index. At step 330, the structure access circuit 110 generates a memory access request based on the configuration information and the structure access request. In other words, the structure access circuit 110 translates the structure access request into the memory access request based on the configuration information. The memory access request includes the first physical address, and step 332 is performed. Step 332 is further performed after step 318.

Referring now to FIG. 3C, at step 332, the structure access circuit 110 performs a memory operation associated with the structure access request by accessing the physical address (such as the first or second physical address). At step 334, the structure access circuit 110 determines whether the memory operation is a write operation. If at step 334, the structure access circuit 110 determines that the memory operation is a write operation, step 336 is executed. At step 336, the structure access circuit 110 writes data (such as the first data) at the physical address. However, if at step 334, the structure access circuit 110 determines that the memory operation is not a write operation, step 338 is executed.

At step 338, the structure access circuit 110 determines whether the memory operation is a read operation. If at step 338, the structure access circuit 110 determines that the memory operation is a read operation, step 340 is executed. At step 340, the structure access circuit 110 reads data (such as the second data) stored at the physical address in the memory 106. At step 342, the structure access circuit 110 extracts the third data from the second data. The third data corresponds to the first structure element 204a or the first structure sub-element 206a. At step 344, the structure access circuit 110 transmits the structure access response to the processor 102 in response to the structure access request. Step 344 is further performed after step 336.

It will be understood by a person skilled in the art that even though the structure access circuit 110 receives the configuration information from the structure configuration circuit 108, the scope of the present invention is not limited to it. In an alternate embodiment, the structure access circuit 110 retrieves a part of the configuration information required for the generating the memory access request.

Since, the abstraction of the memory 106 into the data structures is dynamic, the configuration information is modified based on the dynamic abstraction of the memory 106 and updated in the structure configuration circuit 108. Further, as the processor 102 accesses the memory 106 by way of the structure access circuit 110, the structure access circuit 110 serves as an abstraction layer between the processor 102 and the memory 106. The processor 102 accesses the memory 106 by way of a structure element (such as the first structure element 204a) or a structure sub-element (such as the first structure sub-element 206a) instead of a physical address of the memory location. Thus, the addressing capability of the processor 102 is extended to access the available space of the memory 106.

The structure access circuit 110 determines the physical address (such as the first through fourth physical addresses) to be accessed by translating the structure access request into the memory access request. Thus, a computing overhead on the processor 102 due to the determination of the physical address is reduced as compared to conventional memory access systems. Further, the structure access circuit 110 accesses the physical address to perform memory operations associated with the structure access request. Thus, a computing overhead on the processor 102 due to data extraction (e.g., reading the second data during a read operation) is further reduced. The reduction in the computing overheads on the processor 102 further results in reduction in power consumed by the processor 102. Additionally, a number of processing cycles required by the processor 102 for performing the memory operations reduces. The reduction in the number of processing cycles enables the processor 102 to efficiently utilize the processing cycles for executing several functional operations, thereby improving a performance of the processor 102 for executing the operations.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A memory access system, comprising:
   a memory that is abstracted into a plurality of data structures, wherein each data structure includes a set of structure elements, and each structure element includes a set of structure sub-elements; and a structure access circuit that accesses the memory, wherein the structure access circuit is configured to:
receive, from a processor, a structure access request for accessing a first structure element of the set of structure elements, wherein the structure access request includes at least a first data structure identifier (ID), a first element ID, and a first index that are associated with the first structure element;
generate a memory access request based on the received structure access request and configuration information associated with the plurality of data structures, wherein to generate the memory access request, the structure access circuit is further configured to:
identify, based on the first data structure ID, a first base address of a first data structure of the plurality of data structures that includes the first structure element;
identify, based on the first element ID, a first element offset and a first element bit width that are associated with the first structure element, wherein the first base address, the first element offset, and the first element bit width are identified from the configuration information;
determine a physical address of the first structure element based on at least the first base address, the first element offset, the first element bit width, and the first index, wherein the memory access request includes the physical address; and
perform, by accessing the determined physical address in the memory, a memory operation associated with the structure access request.

2. The memory access system of claim 1, wherein the memory is abstracted into the plurality of data structures based on an abstract data type of a high-level language.

3. The memory access system of claim 1, wherein the configuration information includes:
a plurality of data structure IDs and a plurality of base addresses that are associated with the plurality of data structures, respectively, wherein one of the plurality of data structure IDs matches the first data structure ID, and wherein the plurality of base addresses include the first base address;
a set of element IDs, a set of element bit widths, and a set of element offsets that are associated with the set of structure elements of each data structure, wherein one of the set of element IDs matches the first element ID, and wherein the set of element bit widths include the first element bit width and the set of element offsets include the first element offset; and
a set of sub-element IDs, a set of sub-element bit widths, and a set of sub-element offsets that are associated with the set of structure sub-elements of each structure element included in each data structure.

4. The memory access system of claim 1, wherein when the memory operation is a write operation, the structure access circuit accesses the physical address to write first data included in the structure access request.

5. The memory access system of claim 1, wherein when the memory operation is a read operation, the structure access circuit accesses the physical address to read second data stored in the memory, and wherein the structure access circuit is further configured to extract third data, corresponding to the first structure element, from the second data and transmit the third data to the processor in response to the structure access request.

6. A method for accessing a memory that is abstracted into a plurality of data structures, the method comprising:
receiving, by a structure access circuit from a processor, a structure access request for accessing a first structure element of a set of structure elements of the memory, wherein each data structure includes the set of structure elements, and each structure element includes a set of structure sub-elements, and wherein the structure access request includes at least a first data structure identifier (ID), a first element ID, and a first index that are associated with the first structure element;
generating, by the structure access circuit, a memory access request based on the received structure access request and configuration information associated with the plurality of data structures, wherein generating the memory access request comprises:
identifying, based on the first data structure ID, a first base address of a first data structure of the plurality of data structures that includes the first structure element;
identifying, based on the first element ID, a first element offset and a first element bit width that are associated with the first structure element, wherein the first base address, the first element offset, and the first element bit width are identified from the configuration information; and
determining a physical address of the first structure element based on at least the first base address, the first element offset, the first element bit width, and the first index, wherein the memory access request includes the determined physical address; and
performing, by the structure access circuit, a memory operation associated with the structure access request, wherein the memory operation is performed by accessing the determined physical address in the memory.

7. The method of claim 6, wherein the memory is abstracted into the plurality of data structures based on an abstract data type of a high-level language.

8. The method of claim 6, wherein the configuration information includes:
a plurality of data structure IDs and a plurality of base addresses that are associated with the plurality of data structures, respectively, wherein one of the plurality of data structure IDs matches the first data structure ID, and wherein the plurality of base addresses include the first base address;
a set of element IDs, a set of element bit widths, and a set of element offsets that are associated with the set of structure elements of each data structure, wherein one of the set of element IDs matches the first element ID, and wherein the set of element bit widths include the first element bit width and the set of element offsets include the first element offset; and
a set of sub-element IDs, a set of sub-element bit widths, and a set of sub-element offsets that are associated with the set of structure sub-elements of each structure element included in each data structure.

9. The method of claim 6, wherein when the memory operation is a write operation, the physical address is accessed by the structure access circuit to write first data included in the structure access request.

10. The method of claim 6, wherein when the memory operation is a read operation, the physical address is accessed by the structure access circuit to read second data stored in the memory.

11. The method of claim 10, further comprising:

extracting, by the structure access circuit, third data, corresponding to the first structure element, from the second data; and transmitting, by the structure access circuit, the third data to the processor in response to the structure access request.

12. A memory access system, comprising:

a memory that is abstracted into a plurality of data structures, wherein each data structure includes a set of structure elements, and each structure element includes a set of structure sub-elements; and a structure access circuit that accesses the memory, wherein the structure access circuit is configured to:

receive, from a processor, a structure access request for accessing a first structure sub-element of the set of structure sub-elements included in a first structure element of a first data structure of the plurality of data structures, wherein the structure access request includes at least a first data structure identifier (ID), a first element ID, a first index, and a first sub-element ID that are associated with the first structure sub-element;

generate a memory access request based on the received structure access request and configuration information associated with the plurality of data structures, wherein the memory access request includes a physical address of the first structure sub-element, and wherein to generate the memory access request, the structure access circuit is further configured to:

identify, based on the first data structure ID, a first base address of the first data structure that is associated with the first structure sub-element;

identify, based on the first element ID, a first element offset and a first element bit width that are associated with the first structure element that includes the first structure sub-element;

identify, based on the first sub-element ID, a first sub-element offset and a first sub-element bit width associated with the first structure sub-element, and wherein the first base address, the first element offset, the first element bit width, the first sub-element offset, and the first sub-element bit width are identified from the configuration information;

determine the physical address of the first structure sub-element based on at least the first base address, the first element offset, the first element bit width, the first index, the first sub-element offset, and the first sub-element bit width; and perform, by accessing the physical address in the memory, a memory operation associated with the structure access request.

13. The memory access system of claim 12, wherein the configuration information includes:

a plurality of data structure IDs and a plurality of base addresses that are associated with the plurality of data structures, respectively, wherein one of the plurality of data structure IDs matches the first data structure ID, and wherein the plurality of base addresses include the first base address;

a set of element IDs, a set of element bit widths, and a set of element offsets that are associated with the set of structure elements of each data structure, wherein one of the set of element IDs matches the first element ID, and wherein the set of element bit widths include the first element bit width and the set of element offsets include the first element offset; and a set of sub-element IDs, a set of sub-element bit widths, and a set of sub-element offsets that are associated with the set of structure sub-elements of each structure element included in each data structure, wherein one of the set of sub-element IDs matches the first sub-element ID, and wherein the set of sub-element bit widths include the first sub-element bit width and the set of sub-element offsets include the first sub-element offset.

14. The memory access system of claim 12, wherein when the memory operation is a write operation, the structure access circuit accesses the physical address to write first data included in the structure access request.

15. The memory access system of claim 12, wherein when the memory operation is a read operation, the structure access circuit accesses the physical address to read second data stored in the memory, and wherein the structure access circuit is further configured to extract third data, corresponding to the first structure sub-element, from the second data and transmit the third data to the processor in response to the structure access request.

* * * * *